United States Patent [19]

Akiyoshi et al.

[11] 4,089,934

[45] May 16, 1978

[54] PROCESS FOR PREPARING CARBON PRODUCTS

[75] Inventors: Osamu Akiyoshi, Tokyo; Akio Mukai, Yokohama; Yoshihiro Miwa, Chigasaki, all of Japan

[73] Assignees: Mitsubishi Chemical Industries Ltd.; Toyo Carbon Co., Ltd., both of Tokyo, Japan

[21] Appl. No.: 779,570

[22] Filed: Mar. 21, 1977

Related U.S. Application Data

[63] Continuation of Ser. No. 644,423, Dec. 24, 1975, abandoned.

[30] Foreign Application Priority Data

Dec. 28, 1974  Japan ................................ 50-671

[51] Int. Cl.$^2$ ................ C01B 31/02; C01B 31/04
[52] U.S. Cl. ......................... 423/448; 208/45; 264/29.1; 423/449
[58] Field of Search .............. 423/445, 448, 449; 264/29.1; 252/502; 208/45, 22

[56] References Cited

U.S. PATENT DOCUMENTS

| | | |
|---|---|---|
| 3,001,237 | 9/1961 | Balaguer ................ 264/29.1 |
| 3,761,387 | 9/1973 | Wegener et al. ........... 208/45 |
| 3,927,187 | 12/1975 | Luhleich et al. .......... 423/448 |

FOREIGN PATENT DOCUMENTS

| | | |
|---|---|---|
| 1,343,365 | 1/1974 | United Kingdom ........ 423/448 |

OTHER PUBLICATIONS

Kirk-Othmer Encyclopedia of Chemical Technology, vol. 4, 1964, pp. 163–185.

*Primary Examiner*—Edward J. Meros
*Attorney, Agent, or Firm*—Oblon, Fisher, Spivak, McClelland & Maier

[57] ABSTRACT

A process for preparing a carbon product which comprises mixing a carbon material, bitumen and a liquid medium to form a slurry, removing the liquid medium of said slurry along with at least a portion of the low molecular weight components of the bitumen to form a solid material, molding the separated solid material and then heat-treating the molded material.

11 Claims, 2 Drawing Figures

PROCESS FOR PREPARING CARBON PRODUCTS

This is a continuation, of application Ser. No. 644,423, filed Dec. 24, 1975, now abandoned.

BACKGROUND OF THE INVENTION

1. Field of the Invention

The present invention relates to a process for preparing a carbon product.

2. Description of the Prior Art

Customarily, carbon products such as graphite electrodes, graphite brushes and the like have been prepared by processes including kneading, molding, baking and graphitizing. Using such conventional processes, periods as long as 3–6 months are required for fabrication. For example, in order to prepare carbon products having relatively high bulk density and high strength, it is customary to blend fine carbon materials. Characteristically, a very high specific surface area of the fine carbon material is required, thereby requiring an increased binder content for the preparation and requiring precisely controlled conditions for heat treatment depending upon the size of the fine carbon material. Accordingly, inner defects such as hairline cracks are easily caused. This tendency is high when a fine carbon black or a similar ingredient is blended in the process. Accordingly, a pretreatment is often employed and a large content of a binder such as coal tar, tar pitch and the like, is blended. As a result it is necessary to keep a low rate of temperature elevation, such as 1°–3° C/hr. in order to prevent formation of a high porosity product, caused by the effects of escaping volatile matter during the calcination and to prevent formation of cracks. As can be seen, there continues to exist a need for an improved process for preparing carbon products, especially of the high bulk density and high strength type.

SUMMARY OF THE INVENTION

Accordingly, it is an object of the present invention to provide a process for preparing a carbon product having few inner defects, a uniform structure and a high strength in a short period of time.

Briefly, this and other objects of this invention as will hereinafter become clear from the ensuing discussion have been attained by providing a process for preparing a carbon product which comprises mixing a carbon material, bitumen and a liquid medium to form a slurry, removing the liquid medium of said slurry along with at least a portion of the low molecular weight components of the bitumen to form a solid material, molding the separated solid material and then heat-treating the molded material.

Also provided is a process for preparing a carbon product by molding a mixture of a carbon material and a modified bitumen and heat-treating the molded material wherein said modified bitumen is produced by removing its low molecular weight components.

BRIEF DESCRIPTION OF DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
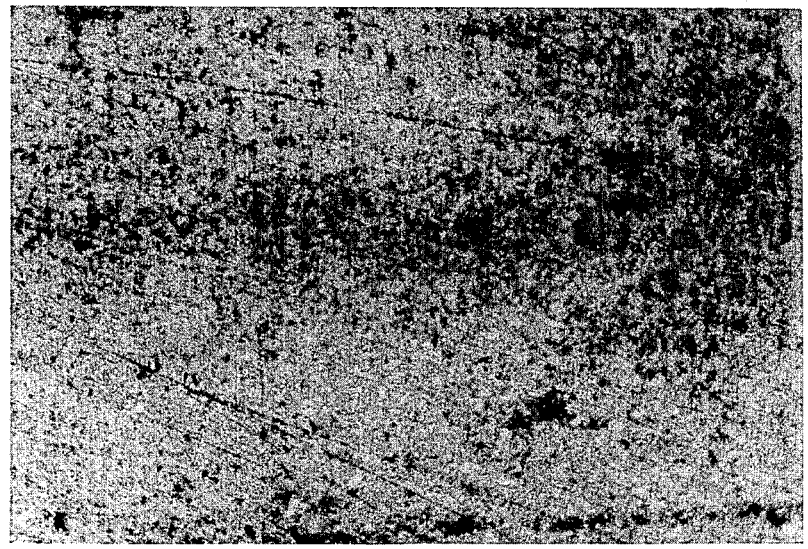
FIGS. 1 and 2 are respectively photographs of the structures of carbon products (graphitized products) prepared by the process of this invention and by a conventional process, which were observed by an optical microscope ($\times$ 130).

Suitable carbon materials for use in this invention include various cokes such as pitch coke, petroleum coke, fluid coke and the like; natural graphite, artificial graphite, carbon black, carbon fiber and the like. The particle size of the carbon material is not critical. However, it is preferred to use a carbon material, more than half of whose particles pass through a 200 micrometer sieve.

Suitable modified bitumens for use as a binder include coal tar, coal tar pitch, petroleum pitch, asphalt, and the like and mixtures thereof. In this invention, the bitumen is treated by a suitable physical or chemical method to remove all or part of the low molecular weight components which are soluble in quinoline or benzene. These components are called $\gamma$-resins. In order to remove these low molecular weight components, solvent extraction-, adsorption-, distillation-, centrifugal separation- methods and the like can be employed. It is also possible to use a modified bitumen produced by removing all the $\gamma$-resins and a part of the middle molecular weight components, i.e., the $\beta$-resins (quinoline soluble and benzene insoluble) from the bitumen. The low molecular weight components can be removed from the bitumen using a mixture of the carbon material and the bitumen. Alternately, the modified bitumen produced by removing the low molecular weight components can be blended with the carbon material.

In this invention, the removal of the low molecular weight components from the bitumen can be attained by the following optimum method, thereby obtaining a desirable carbon product in a short period of time. A carbon material, a bitumen and a liquid medium are mixed to form a slurry and then all or part of the liquid medium-soluble matter is removed to obtain a solid material and thereafter the solid material is molded and heat-treated.

Suitable liquid media for use in this invention include liquid organic compounds which dissolve the low molecular weight components but do not dissolve the high molecular weight components of the bitumen. The liquid medium is preferably selected from aromatic hydrocarbons, alicyclic hydrocarbons, aliphatic hydrocarbons or derivatives thereof: ketones, alcohols, nitrogen containing heterocyclic compounds; and mixtures thereof. The medium is selected according to the nature of the bitumen, the carbon material and the object carbon product. When a fine carbon material is used, it is preferred to use a liquid medium in which the bitumen is highly soluble. On the other hand, when a coarse carbon material is used, it is possible to use a liquid medium in which the bitumen is relatively less soluble. Suitable liquid media of this invention in which the bitumen is highly soluble include benzene, toluene, xylene and the like. Liquid media having higher solubility to the bitumen include pyridine, quinoline, anthracene oil, nitrobenzene, aniline and the like. Suitable liquid media having relatively lower solubilizing properties include cyclohexane, n-heptane, acetone, methanol and the like. In industrial operation, it is especially preferred to use benzene and toluene. The liquid medium need not be composed of one component. It is possible to control the degree of removal between all and a part of the low molecular weight components and, if desirable, a part of the middle molecular weight components of the bitumen by using a suitable mixture of two or more liquids. The liquid medium can be impure and industrial distilled fractions such as a wash oil can be used. When the liquid medium is recovered for recycling, it is possible to use the recovered liquid medium containing a small content of the low molecular weight components dissolved from the bitumen.

The amount of the liquid medium to be used in this invention is dependent upon the nature of the bitumen and the liquid medium and is usually more than three times, preferably more than five times, the weight of the bitumen, it is usually used in amounts 3-30 times the weight of the bitumen. When less than three times by weight is used, a large content of low molecular weight components remains in the separated solid material and the effect of this invention is not satisfactorily attained. On the other hand when more than thirty times by weight is used, the operation is disadvantageous.

The amount of the modified bitumen produced by removing the low molecular weight components is usually less than five times, preferably in the range of 1/15 – 3 times, the weight of the carbon material. When more than five times by weight is used, the solid material is separated as a mass, requiring a crushing operation, and the baking is not smoothly conducted. On the other hand, when too small a content is used, the binding property is insufficient, decreasing the strength of the carbon product, disadvantageously.

In the removal of the low molecular weight components from the bitumen by the liquid medium, a uniform slurry is prepared by mixing the carbon material, the bitumen and the liquid medium. When the three components are mixed with stirring, the low molecular weight components of the bitumen are dissolved in the liquid medium. At the same time, the high molecular weight components are highly dispersed in a condition of free, adhesion or adsorption on the surface of the carbon material without being dissolved in the liquid medium. The order of mixing the components in the operation of the preparation of the slurry is not critical. It is preferred to blend the carbon material with the bitumen and then to mix the liquid medium with the mixture because, as a result, high adhesion of the carbon material and the high molecular weight components of the bitumen, and high dispersion of the high molecular weight components are attained, thereby obtaining a stable carbon product. It is preferred to heat the slurry to promote the dissolution of the low molecular weight components and it is especially preferred to heat the slurry to about its boiling point. It is possible to heat under higher pressures to control the solubilization.

The solid material comprising the carbon material and the insoluble components is separated from the slurry. Since the carbon material functions as a filter aid or a centrifugal filter aid, the solid material can be easily separated from the liquid materials. It can be separated by sedimentation. In this case, it is preferred to heat the slurry to decrease its viscosity. The separated solid material can be subsequently directly molded by a conventional molding method without employment of a kneading step for mixing with a binder. When fine particles are used for the main component of the carbon material such as carbon black, it is possible to use the separated solid material directly as a main component in further processing instead of the material treated by the conventional pretreatment as shown in FIG. 1; it is also possible to knead the mixture of the separated solid material with a binder of coal tar, coal tar pitch and the like.

The separated solid material can also be used as an additive for a carbon material. That is, the separated solid material can be used as an additional component of a mixture of coke and carbon block or as a fine particle component for controlling the particle size of a material which is blended and molded with a binder of coal tar, coal tar pitch and the like. In this use, it is preferred to use fine carbon material most of which passes a 100 micrometer sieve.

A carbon product can be prepared by using the separated solid material in conventional molding processes. When the moldability of the material is insufficient, one or more of the following methods can be applied to improve the moldability;

a. A small amount of another liquid medium having a solubilizing capability higher than that of the liquid medium used, such as quinoline, can be added to dissolve a part of the sold material.

b. An auxiliary agent for molding can be added. Suitable auxiliary agents include thermosettable resins, thermoplastic resins or a solution thereof. It is also possible to add a part of the low molecular weight component of bitumen which is dissolved in the liquid medium. Similar results can be attained by conducting the dissolution under conditions such that a part of the low molecular weight components of the bitumen remain, such as by using a smaller amount of the liquid medium and a lower temperature.

c. The molding temperature or molding pressure can be increased.

The moldability can be improved by these techniques.

A carbon product can be prepared by a baking heat-treatment and graphitization using conventional methods. The molded material prepared without use of a kneading step, contains a quite small content of volatile matter. Accordingly, the rate of temperature rise in the baking step can be increased to several or severl tens times that of the conventional rate of temperature rise. It is possible to insert it directly into the graphitization furnace to conduct the process in one step instead of the usual two steps of baking and graphitization. With regard to the molded material prepared with use of a kneading step, the binder content can be remarkably reduced as compared with the amount otherwise used. Accordingly, the rate of temperature rise in the baking step can be increased as compared with that of the conventional method. Suitable temperatures for use in this baking step include 300° – 2,000° C, preferably 700° – 1,600° C, especially 1,000° – 1,200° C. (The baking step can be eliminated if desired). Suitable temperatures for use in the graphitization step include 1,800° – 3,200° C, preferably 2,000° – 3,000° C, especially 2600° – 3,000° C.

The following is a diagram of one conventional process for preparing a carbon product such as a graphite brush.

Pretreatment:

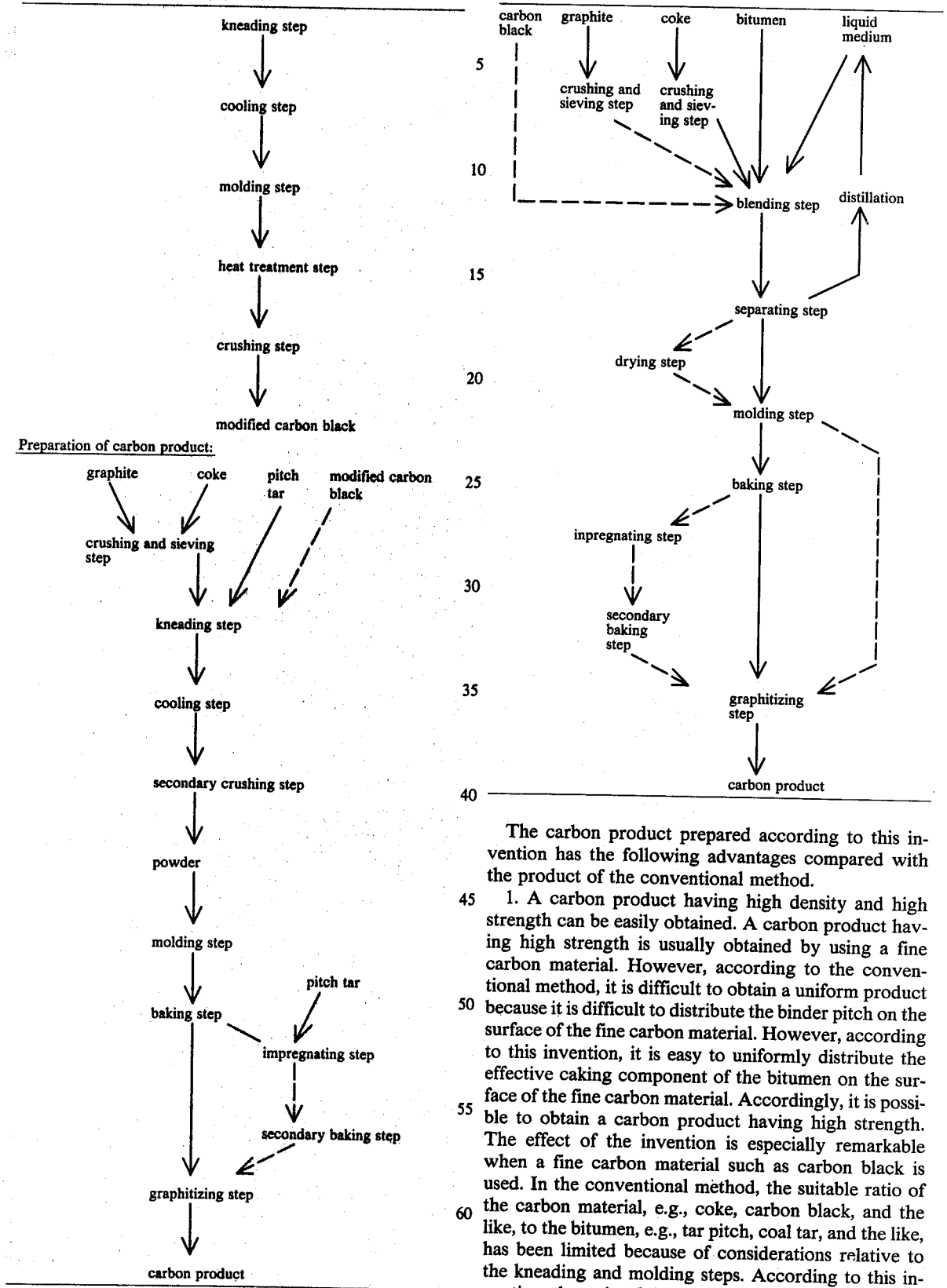

The following is a diagram of one embodiment of this invention.

The carbon product prepared according to this invention has the following advantages compared with the product of the conventional method.

1. A carbon product having high density and high strength can be easily obtained. A carbon product having high strength is usually obtained by using a fine carbon material. However, according to the conventional method, it is difficult to obtain a uniform product because it is difficult to distribute the binder pitch on the surface of the fine carbon material. However, according to this invention, it is easy to uniformly distribute the effective caking component of the bitumen on the surface of the fine carbon material. Accordingly, it is possible to obtain a carbon product having high strength. The effect of the invention is especially remarkable when a fine carbon material such as carbon black is used. In the conventional method, the suitable ratio of the carbon material, e.g., coke, carbon black, and the like, to the bitumen, e.g., tar pitch, coal tar, and the like, has been limited because of considerations relative to the kneading and molding steps. According to this invention, the ratio of the carbon material to the bitumen can be selected from a broad range and a large amount of the caking component can be incorporated in the molded material. Accordingly, a carbon product having few inner defects and a high strength can be obtained.

2. A carbon product having high porosity and high strength can be obtained. When a carbon product having high porosity is prepared by the conventional method, the strength of the product is too low. According to this invention, a carbon product having both high porosity and high strength can be easily obtained.

3. Carbon products whose quality variations are small can be obtained. According to this invention, the volatilization loss in the calcination is small and the contraction of the carbon product in the calcination is relatively low. Accordingly, variation in the quality of the products caused by variations of the rate of the temperature rise, is low as compared with that of the conventional method, and a carbon product having stable quality can be easily obtained.

According to this invention, the following process advantages can be attained.

1. The time of operation can be shortened. According to the conventional method, it takes 3–6 months for product fabrication. However, in the case of direct graphitization of the molded material without use of a calcination step according to this invention, it takes only about 7–10 days. In other applications, is is easy to cut 1–2 months off the required time as compared with the conventional method. As can be seen, production planning can be improved and feed-back of product quality information can be expedited.

2. The cost can be reduced. According to this invention, the reduction in cost resulting from the simplification of the steps is remarkable and the cost decrease resulting from the reduction in the number of cracked products is also remarkable. Moreover, inexpensive coal tar pitch and the like can be used as a binder. Accordingly, the cost can be further decreased compared with the use of expensive resin as a binder. Furthermore, an inexpensive liquid medium can be used and most parts of the liquid medium can be recovered and reused. Additionally, the low molecular weight components in the bitumen can be used as an auxiliary fuel and or raw material for immersion.

3. The operation environment is improved. According to the conventional method, a toxic mist and dust and the like are formed in the kneading, cooling and secondary crushing steps. In order to remove the toxic mist and dust, a special treatment is required. In some cases, an expensive removal apparatus is required. According to this invention, most of the low molecular weight components containing the toxic materials are removed by dissolving them in the liquid medium. Accordingly, the operation environment can easily be maintained in good condition.

The invention will be further illustrated by certain examples which are provided for purpose of illustration only and are not intended to be limiting in any manner.

In the examples, the bending strength, the Shore-hardness and the electric and specific resistance all refer to data measured in the parallel direction.

Having generally described the invention, a more complete understanding can be obtained by reference to certain specific examples, which are included for purposes of illustration only and are not intended to be limiting unless otherwise specified.

EXAMPLE 1

Figure 2:
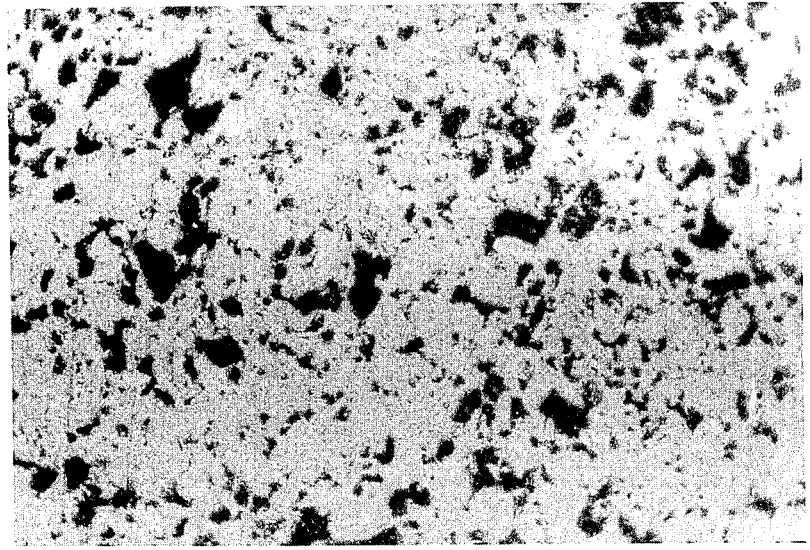

A slurry of 660 g of pitch coke having an average diameter of 5 micrometers as the carbon material (aggregate), 1320 g of coal tar pitch as the bitumen and 13200 g of benzene as the liquid medium was stirred at a rate of 100 rpm while refluxing at 80° C for 1 hour. Then, the slurry was filtered at 60° C by a glass filter to separate the solid material. The separated solid material was dried at 50° C under a reduced pressure of 60 torr for 3 hours. The dried material was molded at 200° C under a compression of 500 kg/cm² to obtain a molded material having a diameter of 85 mm and a thickness of 35 mm. Without using the conventional two steps of a first heat treatment of a calcination and a second heat treatment of a graphitization, the molded material was inserted in a graphitization furnace and was heated to 3000° C during 65 hours to obtain the carbon product. The characteristics of the resulting carbon product were the same or better than those of the products prepared by the conventional method, in spite of the fact that the product was prepared by a direct graphitization without use of a calcination step, as shown in Table 1. The resulting carbon product had a uniform structure as shown in FIG. 1 as compared to that of the product of the conventional method as shown in FIG. 2. The photographs of FIGS. 1 and 2 show the results of optical microscopic observation ($\times$ 130).

Table 1

|  | Example 1 | Reference 1 |
|---|---|---|
| Bulk density (g/cm³) | 1.70 | 1.75 |
| Bending strength (kg/cm²) | 400 | 350 |
| Shore hardness | 50 | 45 |
| Structure | FIG. 1 | FIG. 2 |

EXAMPLE 2

In accordance with the process of Example 1, a slurry of 45 g of carbon black (thermal black) as the carbon material, 67.5 g of coal tar pitch as the bitumen, 675 g of benzene as the liquid medium was treated to obtain a molded material having a diameter of 55 mm and a thickness of 10 mm. Then, the molded material was heat-treated for graphitization to obtain a carbon product. The characteristics of the resulting carbon product were remarkably superior to those of the carbon product prepared by the conventional method as shown in Table 2.

Table 2

|  | Example 2 | Reference 2 |
|---|---|---|
| Bulk density (g/cm³) | 1.65 | 1.65 |
| Bending strength (kg/cm²) | 40 | 370 |
| Electric specific resistance (Ω cm) | 5000 × 10⁻⁶ | 4500 × 10⁻⁶ |
| Shore hardness | 53 | 55 |

EXAMPLE 3

In accordance with the process of Example 1, a slurry of 45 g of carbon black (thermal carbon black) as the carbon material, 24.3 g of coal tar pitch as the bitumen and 243 g of benzene as the liquid medium was treated to obtain a separated solid material. A 57 g sample of the separated solid material was mixed with 27 g of coal tar pitch, the mixture was kneaded at 150° C for 60 minutes, and it was cooled and crushed to obtain a crushed powder. The powder was molded under a compression of 1000 kg/cm² at room temperature to obtain a molded material having a diameter of 55 mm and a thickness of 26 mm. The molded material was baked and graphitized. The pretreatment could be simplified. A carbon product having characteristics as shown in Table 3 was obtained. The bulk density of the product shown in Table 3 was higher than that of the conventional one.

Table 3

|  | Example 3 |
| --- | --- |
| Bulk density (g/cm³) | 1.75 |
| Bending strength (kg/cm²) | 400 |
| Electric specific resistance (Ω cm) | 5000 × 10⁻⁶ |
| Shore hardness | 55 |

EXAMPLE 4

In accordance with the process of Example 1, a slurry of 600 g of petroleum coke having an average diameter of less than 5 micrometers as the carbon material, 1320 g of coal tar pitch as the bitumen and 13200 g of benzene as the liquid medium was treated and molded under a compression of 1000 kg/cm² to obtain a molded material having a diameter of 85 mm and a thickness of 40 mm. The molded material was heat-treated for graphitization to obtain a carbon product. The characteristics of the resulting carbon product were the same as or superior to those of the carbon product prepared by the complicated conventional method as shown in Table 4.

Table 4

|  | Example 4 | Reference 1 |
| --- | --- | --- |
| Bulk density (g/cm³) | 1.70 | 1.75 |
| Bending strength (kg/cm²) | 480 | 350 |
| Shore hardness | 43 | 45 |

EXAMPLE 5

In accordance with the process of Example 1, a slurry of 180 g of pitch coke having an average diameter of 5 micrometers, 20 g of artifical graphite having an average diameter of 28 micrometers, as the carbon material, 400 g of coal tar pitch as the bitumen and 4000 g of benzene as the liquid medium was treated. The dried material was molded under a compression of 500 kg/cm² at 150° C to obtain a molded material having a diameter of 30 mm and a thickness of 15 mm. Then the molded material was heat-treated for graphitization to obtain a carbon product. The characteristics of the resulting carbon product were the same as or superior to those of the carbon product prepared by the complicated conventional method as shown in Table 5.

EXAMPLE 6

In accordance with the process of Example 1, a slurry of 60 g of field coke having an average diameter of 0.3 mm and 140 g of artificial graphite having an average diameter of 28 micrometers, as the carbon material, 300 g of coal tar pitch as the bitumen and 3000 g of benzene as the liquid medium was treated. The dried material was molded at 150° C under a compression of 500 kg/cm² to obtain a molded material having a diameter of 30 mm and a thickness of 17 mm. The molded material was heat-treated for graphitization to obtain a carbon product. The characteristics of the resulting carbon product were the same as or superior to those of the carbon product prepared by the complicated conventional method as shown in Table 5.

EXAMPLE 7

A slurry of 200 g of pitch coke having an average diameter of 5 micrometers as the carbon material, 400 g of petroleum pitch as the bitumen and 4000 g of toluene as the liquid medium was treated at 120° C under refluxing with stirring at 100 rpm. The slurry was filtered with a glass filter to separate the solid component. The separated solid was dried at 80° C under a reduced pressure of 60 torr for 4 hours. The dried material was molded at 150° C under a compression of 500 kg/cm² to obtain a molded material having a diameter of 30 mm and a thickness of 16 mm. The characteristics of the resulting carbon product were the same as or superior to those of the carbon product prepared by the complicated conventional method as shown in Table 5.

EXAMPLE 8

In accordance with the process of Example 1, a slurry of 200 g of pitch coke having an average diameter of 5 micrometers as the carbon material, 200 g of liquified coal as the bitumen and 1000 g of benzene as the liquid medium was treated. The dried material was molded at 150° C under a compression of 500 kg/cm² to obtain a molded material having a diameter of 30 mm and a thickness of 16 mm. The molded material was heat-treated for graphitization to obtain a carbon product. The characterstics of the resulting carbon product were the same as or superior to those of the carbon product prepared by the complicated conventional method as shown in Table 5.

Table 5

|  | Ref. 3 | Exp. 5 | Exp. 6 | Exp. 7 | Exp. 8 |
| --- | --- | --- | --- | --- | --- |
| Bulk density (g/cm³) | 1.75 | 1.68 | 1.72 | 1.62 | 1.72 |
| Bending strength (kg/cm²) | 660 | 700 | 1110 | 690 | 750 |
| Shore hardness | 45 | 47 | 77 | 43 | 50 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for preparing a carbon product, which comprises:
    mixing a carbon material, a bitumen selected from the group consisting of coal tar, coal tar pitch, petroleum pitch, asphalt, liquified coal, and mixtures thereof, and an organic solvent to form a slurry such that said solvent selected is sufficient to dissolve at least a portion of the low molecular weight, γ-resins in said bitumen which are characterized by being soluble in quinoline and benzene, but not the high molecular weight components thereof, separating the liquid phase from the solid material of said slurry;
    molding the separated solid material; and then
    heating treating the molded material.

2. The process of claim 1, which further comprises heat-treating said molded material by graphitizing said molded material at a temperature of 2000°–3000° C.

3. The process of claim 1, which further comprises heat-treating said molded material by baking said molded solid material at a temperature of 300°–2000° C followed by graphitizing said molded material at a temperature of 2000°–3000° C.

4. The process of claim 1, wherein aid slurry of said carbon material, said bitumen and said organic solvent is heated to dissolve at least a portion of the low molecular weight, γ-resin components and to uniformly distribute the resulting modified bitumen on the surface of the carbon material and wherein the solid material is separated and molded and thereafter the molded material is graphitized.

5. The process of claim 1, wherein the carbon material is carbon black, graphite or coke powder.

6. The process of claim 1, wherein the organic solvent is selected from the group consisting of aromatic hydrocarbons, alicyclic hydrocarbons, aliphatic hydrocarbons, ketones, alcohols, nitrogen containing heterocyclic compounds and mixtures thereof.

7. The process of claim 1, wherein the separated solid material is mixed with a bitumen prior to molding and the molded material heat-treated to graphitize the molded material.

8. The process of claim 1, wherein the heat-treatment is a baking of the molded material.

9. The process of claim 4, wherein said graphitization is conducted over a temperature range of 2000°–3000° C.

10. The process of claim 4, wherein said molded material is baked at a temperature of 300°–2000° C prior to said graphitization.

11. The process of claim 3, which further comprises impregnating said baked solid material with bitumen;
baking said impregnated solid material; and
thereafter graphitizing said baked solid material.

* * * * *